(12) United States Patent
Smith

(10) Patent No.: US 10,154,659 B2
(45) Date of Patent: Dec. 18, 2018

(54) FISHING ROD HOLDING ASSEMBLY

(71) Applicant: Michael Smith, York Town, VA (US)

(72) Inventor: Michael Smith, York Town, VA (US)

( * ) Notice: Subject to any disclaimer, the term of this patent is extended or adjusted under 35 U.S.C. 154(b) by 5 days.

(21) Appl. No.: 15/346,816

(22) Filed: Nov. 9, 2016

(65) Prior Publication Data

US 2018/0125050 A1    May 10, 2018

(51) Int. Cl.
*A01K 97/10*    (2006.01)
*F16M 11/26*    (2006.01)
*F16M 11/38*    (2006.01)
*F16M 13/02*    (2006.01)
*A45F 3/44*    (2006.01)

(52) U.S. Cl.
CPC .............. *A01K 97/10* (2013.01); *A45F 3/44* (2013.01); *F16M 11/26* (2013.01); *F16M 11/38* (2013.01); *F16M 13/022* (2013.01)

(58) Field of Classification Search
CPC .......... A45F 3/44; A01K 97/10; F16M 11/26; F16M 11/38; F16M 13/022
USPC ....... 248/519, 520, 522, 528, 532, 535, 534, 248/558, 912, 911, 518, 538, 511, 512, 248/513, 514, 515; 297/188.2, 188.01, 297/288.21, 217.1; 43/21.2
See application file for complete search history.

(56) References Cited

U.S. PATENT DOCUMENTS

| | | | |
|---|---|---|---|
| 1,523,223 A * | 1/1925 | Leonardos | A01K 97/10 248/185.1 |
| 1,865,453 A * | 7/1932 | Baltzley | B42F 1/006 24/545 |
| 2,249,302 A * | 7/1941 | Smith | A01K 97/10 43/21.2 |
| 2,438,388 A * | 3/1948 | Dolk | A01K 97/10 248/532 |
| 2,502,684 A * | 4/1950 | Ward | A01K 97/10 248/515 |
| 3,077,327 A * | 2/1963 | Batie | A01K 97/06 248/150 |
| 3,125,372 A * | 3/1964 | Rose | A47C 7/72 297/188.2 |
| 3,309,808 A * | 3/1967 | George, Sr. | A01K 97/10 248/533 |
| 3,570,793 A * | 3/1971 | Shackel | A01K 97/10 248/205.1 |
| 3,709,448 A * | 1/1973 | Valverde | A01K 97/10 248/533 |
| 3,709,556 A * | 1/1973 | Allard | A61G 5/10 248/125.1 |
| 3,846,929 A * | 11/1974 | McBride | A01K 97/10 43/17 |

(Continued)

FOREIGN PATENT DOCUMENTS

GB        2164531 A   *   3/1986   ............. A01K 97/10

*Primary Examiner* — Kimberly T Wood

(57) ABSTRACT

A fishing rod holding assembly for PURPOSE includes a tube that insertably receives a fishing rod. A pair of holding units is provided. Each of the holding units is coupled to the tube. Each of the holding unit selectively engages a diagonal support of a chair. Thus, the tube is positioned at an upward angle with respect to the ground. A stand is coupled to the tube. The stand is selectively positioned in a deployed position. Thus, the stand supports the tube above ground. The stand is selectively positioned in a solo position. Thus, the stand supports the tube on the ground when the tube is not coupled to the chair.

11 Claims, 7 Drawing Sheets

(56) References Cited

U.S. PATENT DOCUMENTS

| | | | |
|---|---|---|---|
| 4,177,595 A | 12/1979 | Chon | |
| 4,372,072 A | 2/1983 | Comeau | |
| 5,038,511 A * | 8/1991 | Gessner | A01K 97/10 248/528 |
| 5,063,701 A | 11/1991 | Ottens | |
| 5,131,179 A * | 7/1992 | McEwen | A01K 97/05 206/315.11 |
| 5,367,815 A * | 11/1994 | Liou | A01K 97/10 248/514 |
| 5,374,074 A * | 12/1994 | Smith | A61G 5/10 280/304.1 |
| 5,400,996 A | 3/1995 | Drish | |
| 5,560,137 A | 10/1996 | Herring | |
| D418,195 S | 12/1999 | Perry | |
| 6,128,848 A * | 10/2000 | Wong | A01K 97/10 43/21.2 |
| 6,142,350 A * | 11/2000 | Alexander | B60R 11/00 224/407 |
| 6,227,510 B1 * | 5/2001 | McMullen, Sr. | A47C 7/68 248/230.5 |
| 6,421,948 B1 * | 7/2002 | Craig | A01K 97/01 248/231.51 |
| 6,651,374 B1 * | 11/2003 | Ridlen | A01K 97/10 248/514 |
| 7,226,126 B1 * | 6/2007 | Spanovich | A47C 7/66 135/96 |
| 7,254,915 B2 * | 8/2007 | Mrotek | A01K 97/01 248/227.1 |
| 7,527,330 B2 * | 5/2009 | Montpas | A47C 7/66 135/16 |
| 8,595,973 B1 * | 12/2013 | Kunz | A01K 97/10 248/514 |
| 2002/0023996 A1 * | 2/2002 | Kondash | A01K 97/10 248/520 |
| 2002/0113710 A1 * | 8/2002 | Brake | A01K 97/10 340/573.2 |
| 2006/0218844 A1 * | 10/2006 | Oliver | A01K 97/10 43/21.2 |
| 2012/0216441 A1 * | 8/2012 | Broderick | A01K 97/01 43/21.2 |
| 2013/0232844 A1 * | 9/2013 | Gallo | A45B 3/00 42/94 |
| 2014/0047758 A1 * | 2/2014 | Ciciulla | A01K 97/10 43/21.2 |

* cited by examiner

FISHING ROD HOLDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to holding devices and more particularly pertains to a new holding device for holding a fishing rod while fishing.

BRIEF SUMMARY OF THE INVENTION

An embodiment of the disclosure meets the needs presented above by generally comprising a tube that insertably receives a fishing rod. A pair of holding units is provided. Each of the holding units is coupled to the tube. Each of the holding unit selectively engages a diagonal support of a chair. Thus, the tube is positioned at an upward angle with respect to the ground. A stand is coupled to the tube. The stand is selectively positioned in a deployed position. Thus, the stand supports the tube above ground. The stand is selectively positioned in a solo position. Thus, the stand supports the tube on the ground when the tube is not coupled to the chair.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
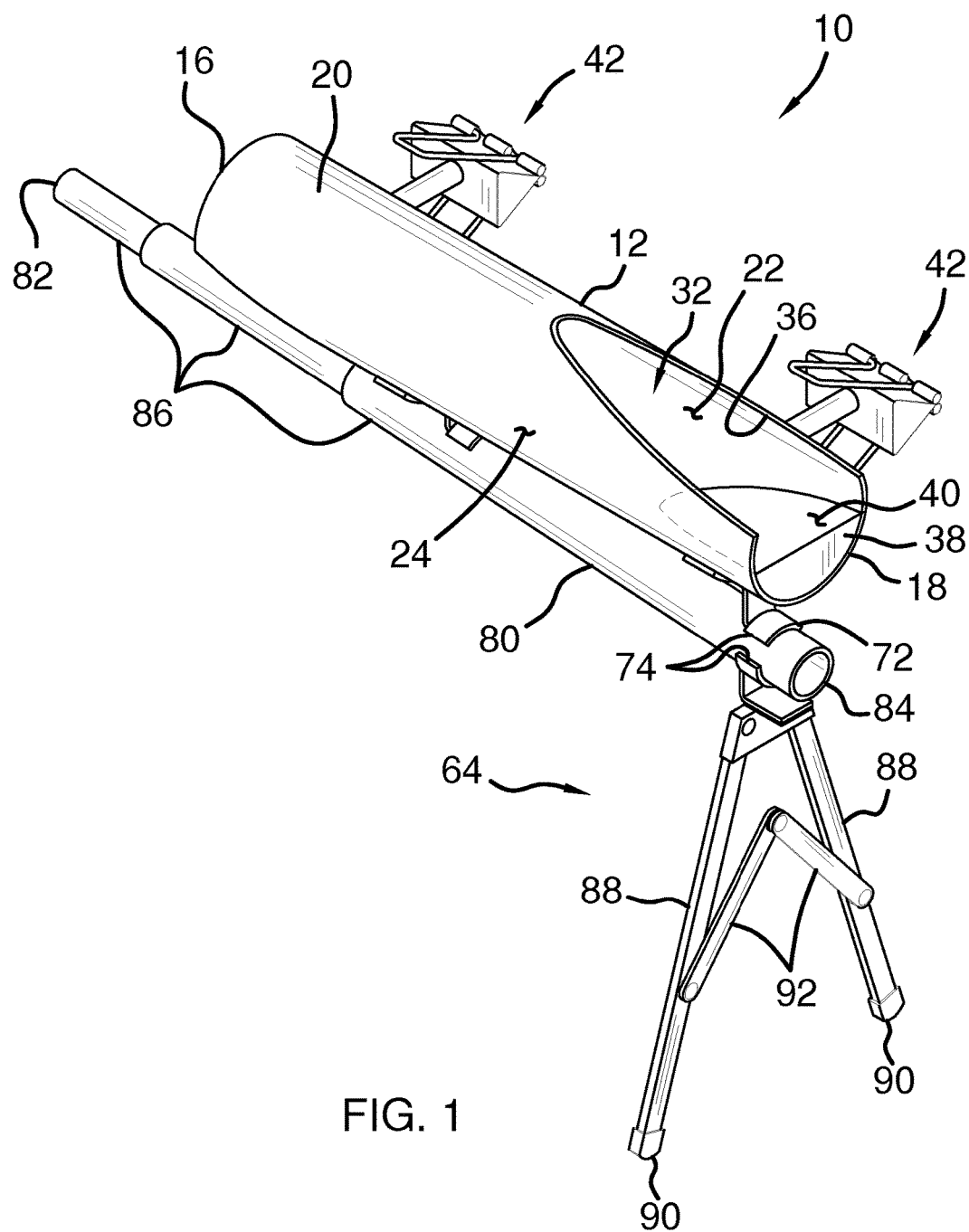
FIG. 1 is a front perspective view of a fishing rod holding assembly according to an embodiment of the disclosure.
Figure 2:
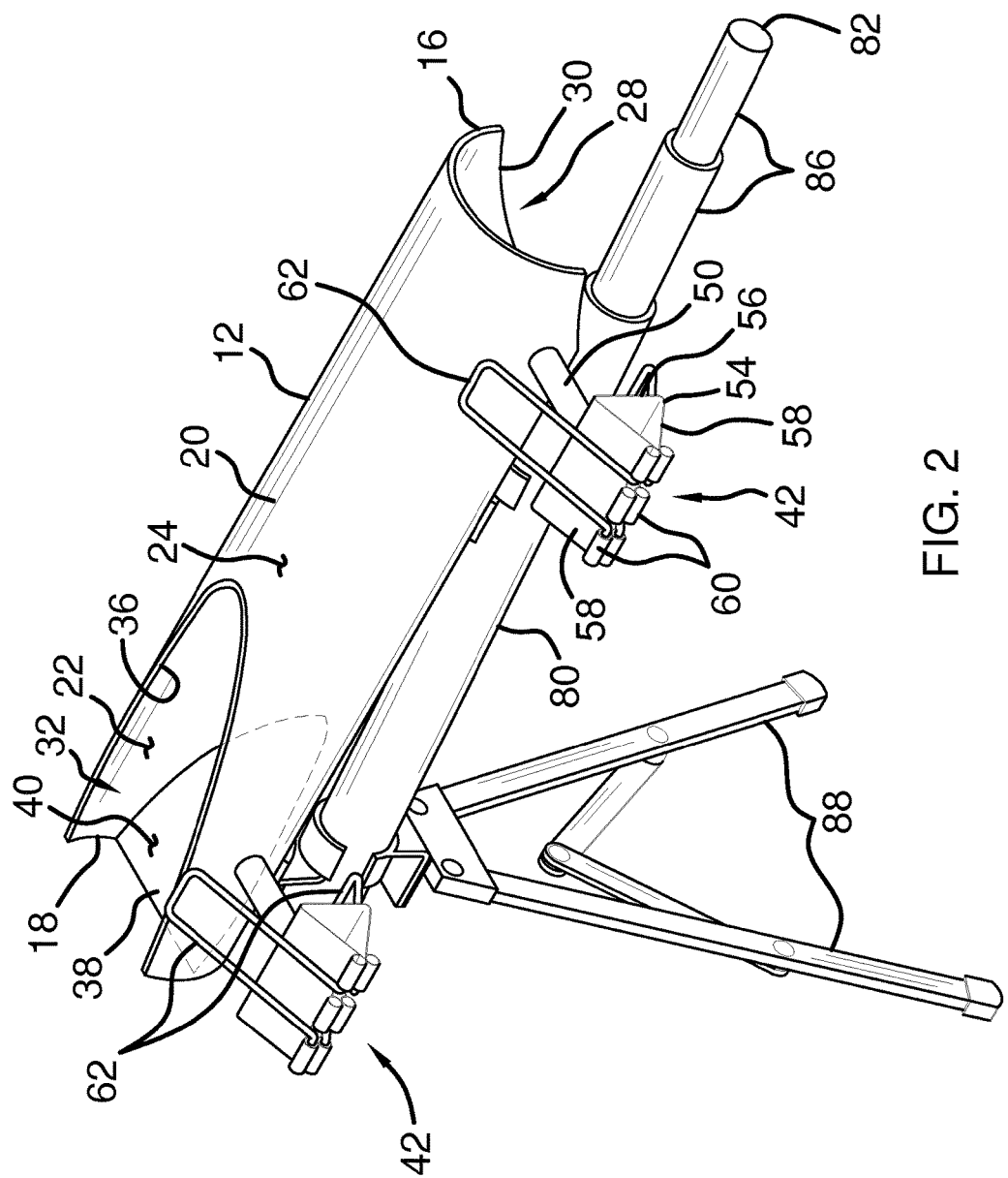
FIG. 2 is a back perspective view of an embodiment of the disclosure.
Figure 3:
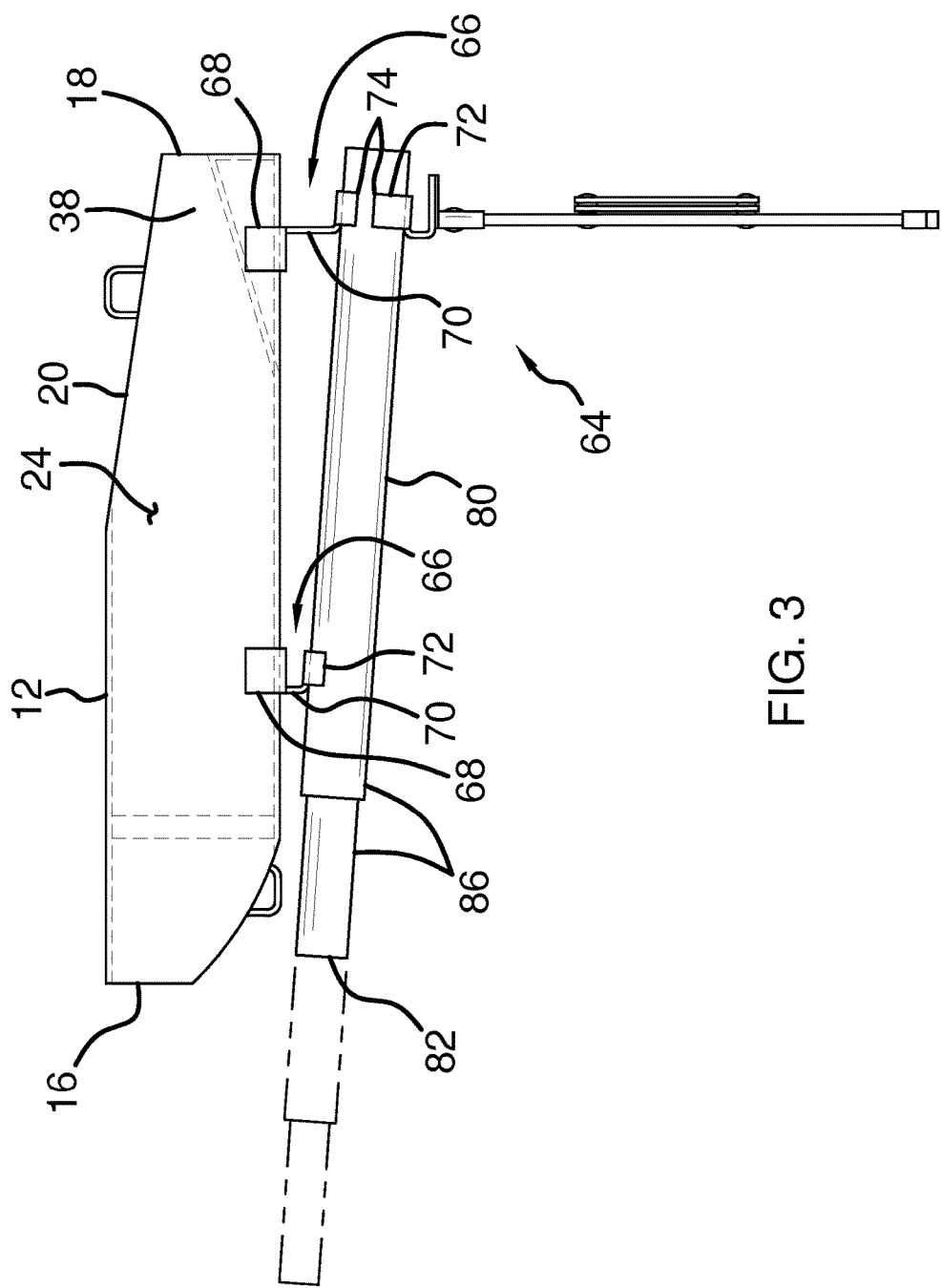
FIG. 3 is a right side view of an embodiment of the disclosure.
Figure 4:
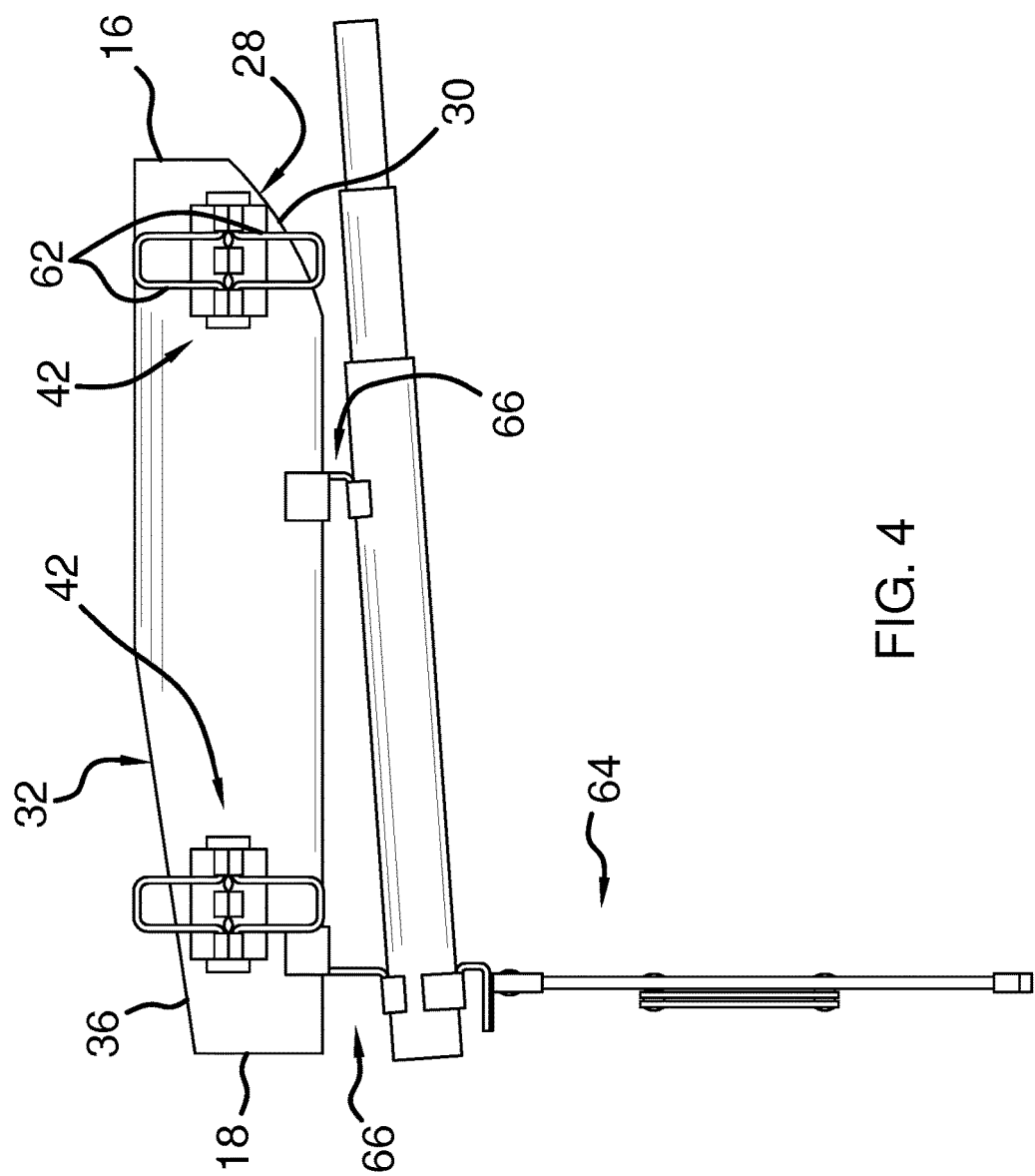
FIG. 4 is a left side view of an embodiment of the disclosure.
Figure 5:
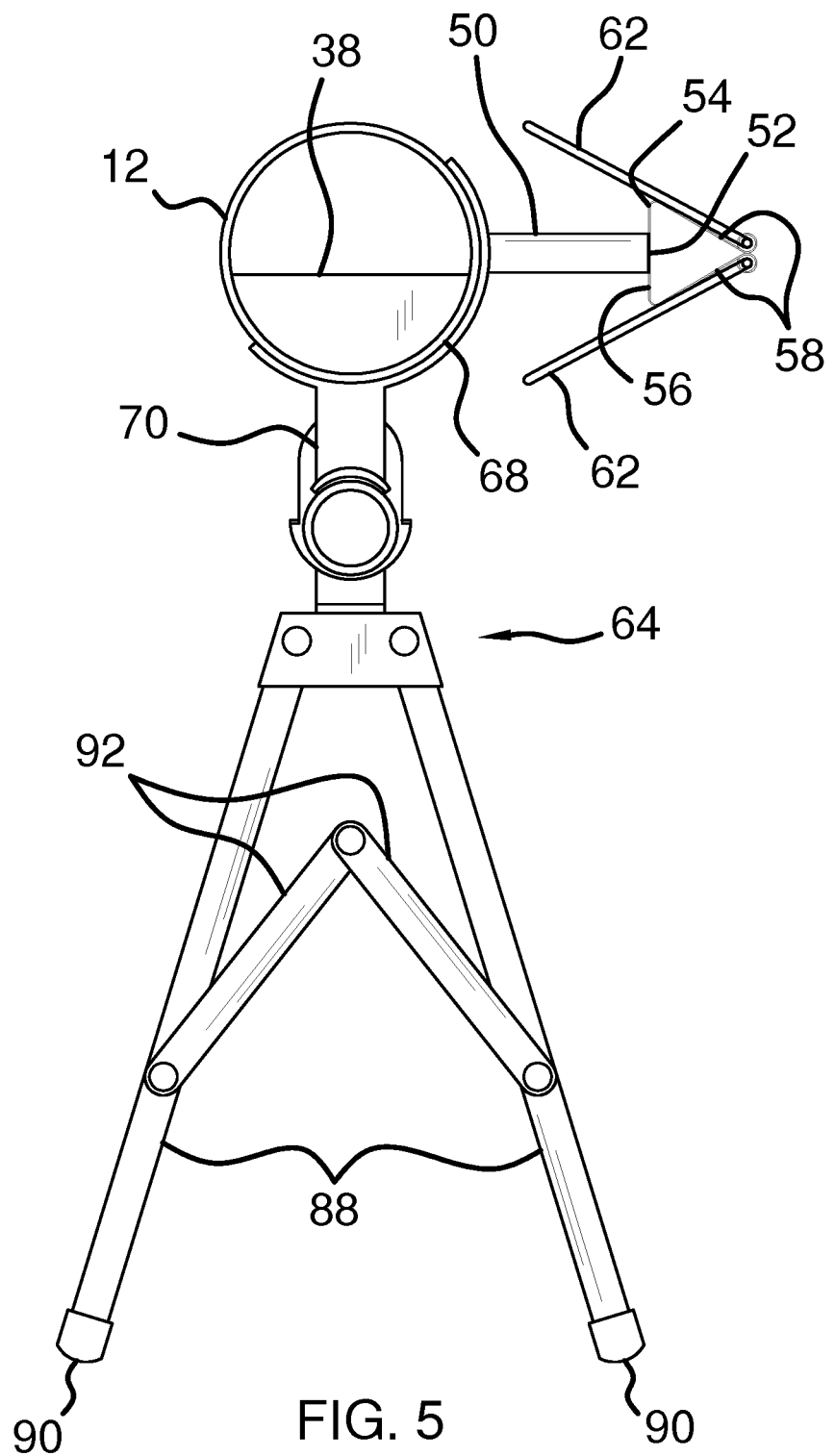
FIG. 5 is a front view of an embodiment of the disclosure.
Figure 6:
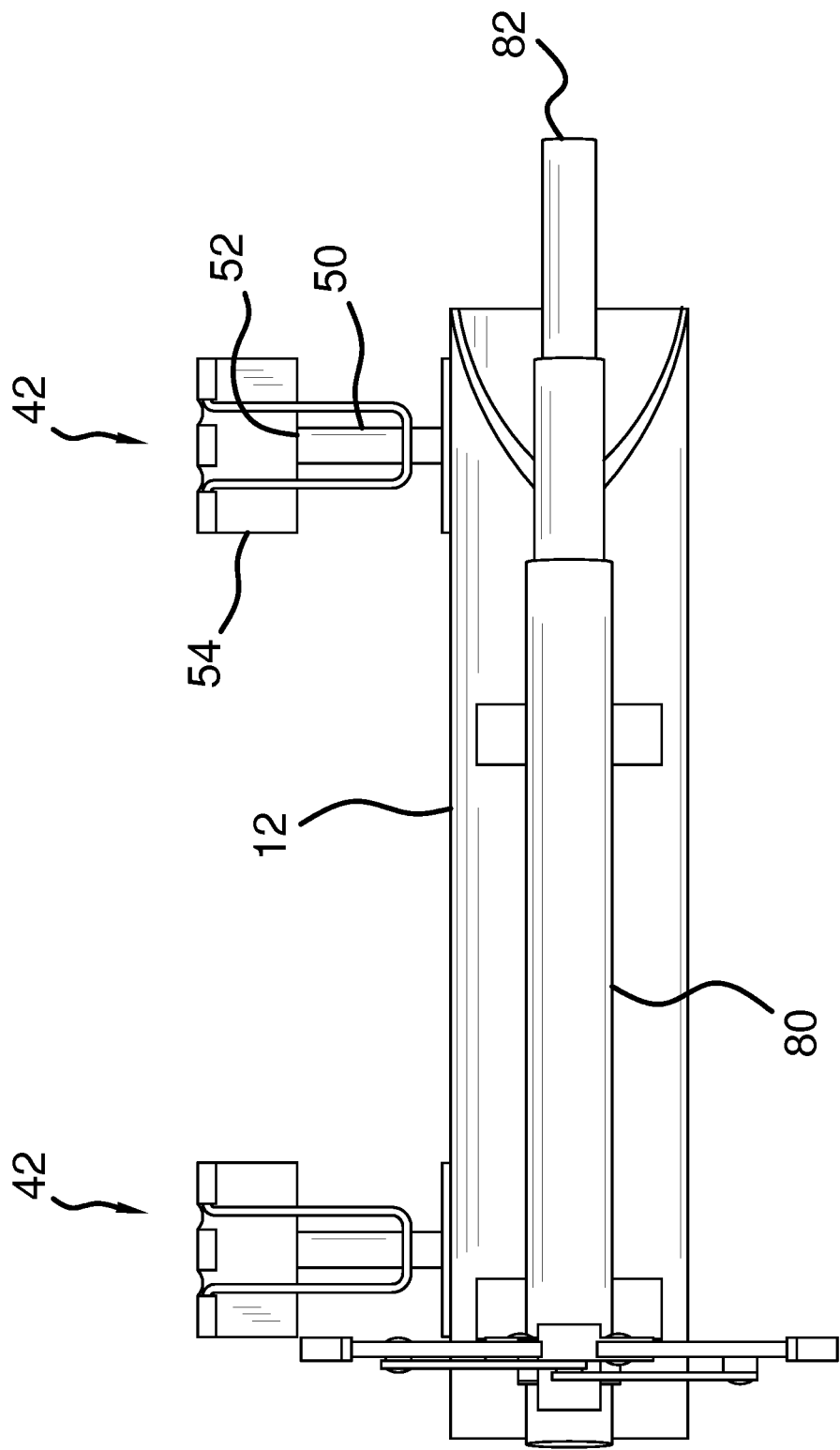
FIG. 6 is a bottom view of an embodiment of the disclosure.
Figure 7:
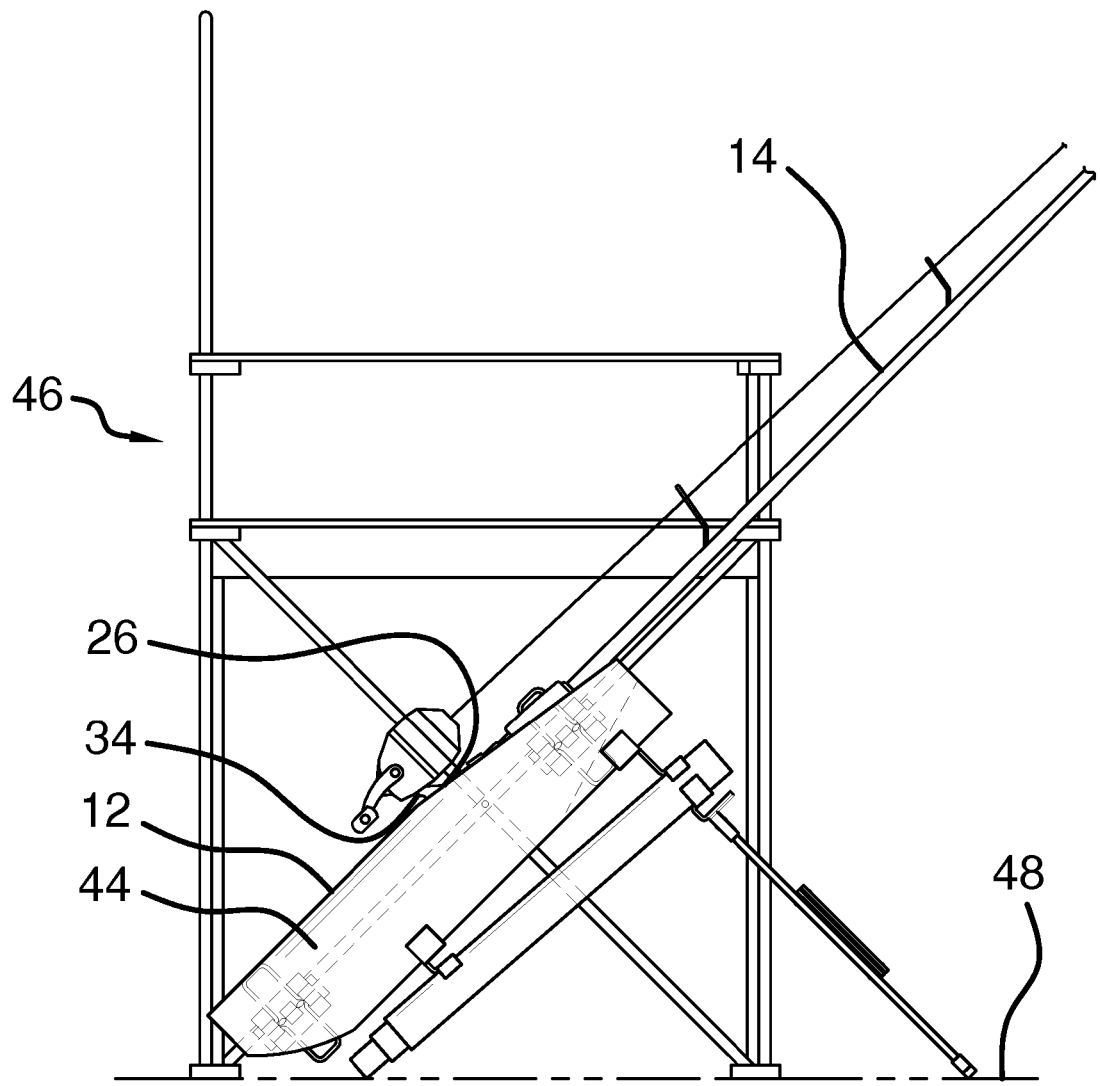
FIG. 7 is a perspective in-use view of an embodiment of the disclosure.

With reference now to the drawings, and in particular to FIGS. 1 through 7 thereof, a new holding device embodying the principles and concepts of an embodiment of the disclosure and generally designated by the reference numeral 10 will be described.

As best illustrated in FIGS. 1 through 7, the fishing rod holding assembly 10 generally comprises a tube 12. The tube 12 insertably receives a fishing rod 14 thereby facilitating the fishing rod 14 to be positioned for fishing. The tube 12 has a first end 16, a second end 18 and an outer wall 20. The outer wall 20 has an inner surface 22 and an outer surface 24. The second end 18 insertably receives a handle 26 of the fishing rod 14. The outer wall 20 has a first cut out portion 28 extending from the first end 16 toward the second end 18. The first cut out portion 28 has a bounding edge 30 and the bounding edge 30 angles downwardly from the first end 16.

The outer wall 20 has a second cut out portion 32 extending from the second end 18 toward the first end 16. The second cut out portion 32 facilitates a reel stem 34 of the fishing rod 14 to pass beyond the second end 18 of the tube 12. The second cut out portion 32 has a bounding edge 36. The bounding edge 36 of the second cut out portion 32 angles upwardly from the second end 18. Moreover, the bounding edge 36 of the second cut out portion 32 forms an angle that is congruent with an angle formed by the first cut out portion 28.

A block 38 is coupled to the inner surface 20 of the tube 12. The block 38 has an exposed surface 40 with respect to the tube 12. The block 38 is aligned with the second cut out portion 32. Thus, the fishing rod 14 rests on the exposed surface 40 when the fishing rod 14 is positioned in the tube 12.

A pair of holding units 42 is provided. Each of the holding units 42 is coupled to the tube 12 and each of the holding units 42 may be manipulated. Each of the holding units 42 selectively engages a diagonal support 44 of a chair 46. The chair 46 may be a folding lawn chair 46 or the like. Thus, the tube 12 is positioned at an upward angle with respect to the ground 48.

Each of the holding units 42 comprises a stem 50 that is coupled to the outer surface 22 of the tube 12. The stem 50 has a distal end 52 with respect to the tube 12. A clip 54 is coupled to the distal end 52 and the clip 54 may be manipulated. The clip 54 frictionally engages the diagonal support 44 of the chair 46.

The clip 54 comprises a central panel 56 extending between a pair of spaced panels 58. Each of the spaced panels 58 has a distal edge 60 with respect to the central panel 56. The distal edge 60 corresponding to each of the spaced panels 58 is biased toward each other. A pair of grips 62 is provided and each of the grips 62 is coupled to the clip 54. Each of the grips 62 is manipulated to selectively urge the distal edge 60 corresponding to each of the spaced panels 58 away from each other. Each of the clips 54 may be a binder clip or the like.

A stand 64 is provided and the stand 64 coupled to the tube 12. The stand 64 is selectively positioned in a deployed position to support the tube 12 above ground 48. The stand 64 is selectively positioned in a solo position. Thus, the stand 64 supports 92 the tube 12 on the ground 48 when the tube 12 is not coupled to the chair 46.

The stand 64 comprises a pair of mounts 66 and each of the mounts 66 is coupled to the outer surface 22 of the tube 12. The mounts 66 are spaced apart from each other. Each of the mounts 66 comprises a saddle 68 that is coupled to the tube 12. A spacer 70 is coupled to and extends 74 away from the saddle 68. A clamp 72 is coupled to the spacer 70 and the clamp 72 has a pair of ends 74. The ends 74 of the clamp 72 are directed toward each other such that the clamp 72 forms an open ring. The pair of mounts 66 includes a first mount 76 and a second mount 78. The spacer 70 corresponding to the first mount 76 has a length that is greater than the spacer 70 corresponding to the second mount 78.

A rod 80 is provided that has a primary end 82 and a secondary end 84. The rod 80 has a plurality of slidable sections 86. Thus, the rod 80 has a telescopically adjustable length. The clamp 72 corresponding to each of the mounts 66 engages the rod 80. Moreover, the rod 80 is coextensive with the tube 12. The rod 80 is selectively extended to a selected length when the stand 64 is positioned in the solo position. The primary end 82 of the rod 80 penetrates ground 48 thereby enhancing stability of the tube 12.

A pair of legs 88 is provided. Each of the legs 88 is hingedly coupled to the clamp 72 corresponding to the first mount 76. Moreover, each of the legs 88 has a distal end 90 with respect to the first mount 76 and the distal end 90 abuts the ground 48. A pair of supports 92 is provided and each of the supports 92 is hingedly coupled to an associated one of the legs 88. The supports 92 are hingedly coupled to each other. Thus, each of the supports 92 retains the legs 88 a predetermined distance apart from each other when the stand 64 is positioned in the deployed position.

In use, each of the clips 54 is manipulated to engage the chair 46. The stand 64 is positioned in the deployed position. The handle 24 of the fishing rod 14 is positioned in the tube 12 when the fishing rod 14 has been cast. Thus, the tube 12 retains the fishing rod 14 on the chair 46. The rod 80 is extended to a selected length and the first end 16 of the rod 80 is urged to penetrate the ground 48 the when the clips 54 are not clipped to the chair 46. Thus, the rod 80 enhances stability of the rod 80 when the tube 12 is not clipped to the chair 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fishing rod holding assembly being configured to be removably coupled to a chair, said assembly comprising:
   a tube being configured to insertably receive a fishing rod thereby facilitating the fishing rod to be positioned for fishing, said tube having a first end, a second end and an outer wall, said outer wall having an inner surface and an outer surface, said second end being configured to insertably receive a handle of the fishing rod, said outer wall having a first cut out portion extending from said first end toward said second end, said first cut out portion having a bounding edge, said bounding edge angling downwardly from said first end, said outer wall having a second cut out portion extending from said second end toward said first end wherein said second cut out portion is configured to facilitate a reel stem of the fishing rod to pass beyond said second end of said tube, said second cut out portion having a bounding edge, said bounding edge of said second cut out portion angling upwardly from said second end at an angle being congruent with an angle formed by said first cut out portion;
   a pair of holding units, each of said holding units being coupled to said tube wherein each of said holding units is configured to be manipulated, each of said holding unit being configured to selectively engage a diagonal support of a chair thereby facilitating said tube to be positioned at an upward angle with respect to the ground;
   a stand being coupled to said tube, said stand being selectively positioned in a deployed position wherein said stand is configured to support said tube above ground, said stand being selectively positioned in a solo position wherein said stand is configured to support said tube on the ground when said tube is not coupled to the chair; and
   a block being coupled to said inner surface of said tube, said block having an exposed surface with respect to said tube, said block being aligned with said second cut out portion wherein said exposed surface is configured to have the fishing pole resting thereon.

2. The assembly according to claim 1, wherein each of said holding units comprises a stem being coupled to said outer surface of said tube, said stem having a distal end with respect to said tube.

3. The assembly according to claim 2, further comprising a clip being coupled to said distal end wherein said clip is configured to be manipulated, said clip being configured to frictionally engage the diagonal support of the chair.

4. The assembly according to claim 3, wherein said clip comprises a central panel extending between a pair of spaced panels, each of said spaced panels having a distal edge with respect to said central panel, said distal edge corresponding to each of said spaced panels being biased toward each other.

5. The assembly according to claim 4, further comprising a pair of grips, each of said grips being coupled to said clip wherein each of said grips is configured to be manipulated, each of said grips selectively urging said distal edge corresponding to each of said spaced panels away from each other.

6. The assembly according to claim 1, wherein said stand comprises a pair of mounts, each of said mounts being coupled to said outer surface of said tube, said mounts being spaced apart from each other, said pair of mounts including a first mount and a second mount.

7. A fishing rod holding assembly being configured to be removably coupled to a chair, said assembly comprising:
a tube being configured to insertably receive a fishing rod thereby facilitating the fishing rod to be positioned for fishing, said tube having a first end, a second end and an outer wall, said outer wall having an inner surface and an outer surface, said second end being configured to insertably receive a handle of the fishing rod;
a pair of holding units, each of said holding units being coupled to said tube wherein each of said holding units is configured to be manipulated, each of said holding unit being configured to selectively engage a diagonal support of a chair thereby facilitating said tube to be positioned at an upward angle with respect to the ground;
a stand being coupled to said tube, said stand being selectively positioned in a deployed position wherein said stand is configured to support said tube above ground, said stand being selectively positioned in a solo position wherein said stand is configured to support said tube on the ground when said tube is not coupled to the chair, said stand comprises a pair of mounts, each of said mounts being coupled to said outer surface of said tube, said mounts being spaced apart from each other, said pair of mounts including a first mount and a second mount; and
wherein each of said mounts comprises
a saddle being coupled to said tube,
a spacer extending away from said saddle, and
a clamp being coupled to said spacer, said clamp having a pair of ends, said ends of said clamp being directed toward each other such that said clamp forms an open ring.

8. The assembly according to claim 7, further comprising a rod having a primary end and a secondary end, said rod having a plurality of slidable sections such that said rod has a telescopically adjustable length, said clamp corresponding to each of said mounts engaging said rod such that said rod is coextensive with said tube, said rod being selectively extended to a selected length when said stand is positioned in said solo position wherein said primary end of said rod is configured to penetrate ground thereby enhancing stability of said tube.

9. The assembly according to claim 7, further comprising a pair of legs, each of said legs being hingedly coupled to said clamp corresponding to said first mount, each of said legs having a distal end with respect to said first mount wherein said distal end is configured to abut the ground.

10. The assembly according to claim 9, further comprising a pair of supports, each of said supports being hingedly coupled to an associated one of said legs, said supports being hingedly coupled to each other such that each of said supports retains said legs a predetermined distance apart from each other when said stand is positioned in said deployed position.

11. A fishing rod holding assembly being configured to be removably coupled to a chair, said assembly comprising:
a tube being configured to insertably receive a fishing rod thereby facilitating the fishing rod to be positioned for fishing, said tube having a first end, a second end and an outer wall, said outer wall having an inner surface and an outer surface, said second end being configured to insertably receive a handle of the fishing rod, said outer wall having a first cut out portion extending from said first end toward said second end, said first cut out portion having a bounding edge, said bounding edge angling downwardly from said first end, said outer wall having a second cut out portion extending from said second end toward said first end wherein said second cut out portion is configured to facilitate a reel stem of the fishing rod to pass beyond said second end of said tube, said second cut out portion having a bounding edge, said bounding edge of said second cut out portion angling upwardly from said second end at an angle being congruent with an angle formed by said first cut out portion;
a block being coupled to said inner surface of said tube, said block having an exposed surface with respect to said tube, said block being aligned with said second cut out portion wherein said exposed surface is configured to have the fishing pole resting thereon;
a pair of holding units, each of said holding units being coupled to said tube wherein each of said holding units is configured to be manipulated, each of said holding unit being configured to selectively engage a diagonal support of a chair thereby facilitating said tube to be positioned at an upward angle with respect to the ground, each of said holding units comprising:
a stem being coupled to said outer surface of said tube, said stem having a distal end with respect to said tube, and
a clip being coupled to said distal end wherein said clip is configured to be manipulated, said clip being configured to frictionally engage the diagonal support of the chair, said clip comprising a central panel extending between a pair of spaced panels, each of said spaced panels having a distal edge with respect to said central panel, said distal edge corresponding to each of said spaced panels being biased toward each other, and
a pair of grips, each of said grips being coupled to said clip wherein each of said grips is configured to be manipulated, each of said grips selectively urging said distal edge corresponding to each of said spaced panels away from each other; and
a stand being coupled to said tube, said stand being selectively positioned in a deployed position wherein said stand is configured to support said tube above ground, said stand being selectively positioned in a solo position wherein said stand is configured to support said tube on the ground when said tube is not coupled to the chair, said stand comprising:
a pair of mounts, each of said mounts being coupled to said outer surface of said tube, said mounts being spaced apart from each other, each of said mounts comprising:
  a saddle being coupled to said tube,
  a spacer extending away from said saddle, and
  a clamp being coupled to said spacer, said clamp having a pair of ends, said ends of said clamp being directed toward each other such that said clamp forms an open ring;
said pair of mounts including a first mount and a second mount,
a rod having a primary end and a secondary end, said rod having a plurality of slidable sections such that said rod has a telescopically adjustable length, said clamp corresponding to each of said mounts engaging said rod such that said rod is coextensive with said tube, said rod being selectively extended to a selected length when said stand is positioned in said solo position wherein said primary end of said rod is configured to penetrate ground thereby enhancing stability of said tube,
a pair of legs, each of said legs being hingedly coupled to said clamp corresponding to said first mount, each of said legs having a distal end with respect to said first mount wherein said distal end is configured to abut the ground, and
a pair of supports, each of said supports being hingedly coupled to an associated one of said legs, said supports being hingedly coupled to each other such that each of said supports retains said legs a predetermined distance apart from each other when said stand is positioned in said deployed position.

* * * * *